(12) United States Patent
Naulin

(10) Patent No.: US 12,025,273 B2
(45) Date of Patent: Jul. 2, 2024

(54) HEAD FOR A PRESSURIZED GAS TANK

(71) Applicant: FAURECIA SYSTEMES D'ECHAPPEMENT, Nanterre (FR)

(72) Inventor: Edouard Naulin, Belfort (FR)

(73) Assignee: FAURECIA SYSTEMES D'ECHAPPEMENT, Nanterre (FR)

( * ) Notice: Subject to any disclaimer, the term of this patent is extended or adjusted under 35 U.S.C. 154(b) by 339 days.

(21) Appl. No.: 17/607,949

(22) PCT Filed: May 5, 2020

(86) PCT No.: PCT/EP2020/062456
§ 371 (c)(1),
(2) Date: Nov. 1, 2021

(87) PCT Pub. No.: WO2020/225262
PCT Pub. Date: Nov. 12, 2020

(65) Prior Publication Data
US 2022/0275911 A1 Sep. 1, 2022

(30) Foreign Application Priority Data
May 7, 2019 (FR) .................................... 19 04769

(51) Int. Cl.
*F17C 13/04* (2006.01)

(52) U.S. Cl.
CPC ...... *F17C 13/04* (2013.01); *F17C 2205/0305* (2013.01); *F17C 2205/0308* (2013.01); *F17C 2205/0323* (2013.01); *F17C 2221/012* (2013.01)

(58) Field of Classification Search
CPC .............. F17C 13/04; F17C 2205/0305; F17C 2205/0308; F17C 13/06
See application file for complete search history.

(56) References Cited

U.S. PATENT DOCUMENTS 3,756,450 A * 9/1973 Crose, Jr. ................. F17C 13/06
220/318
4,462,424 A * 7/1984 Genbauffe ......... G05D 16/0647
137/71
(Continued)

FOREIGN PATENT DOCUMENTS

DE 202004004659 U1 5/2004
DE 102010018700 A1 11/2011
(Continued)

OTHER PUBLICATIONS

International Research Report for International Application No. PCT/EP2020/062456 dated Jul. 31, 2020.
(Continued)

*Primary Examiner* — Vishal Pancholi
(74) *Attorney, Agent, or Firm* — Carlson, Gaskey & Olds, P.C.

(57) ABSTRACT

A head for a pressurised gas tank comprises a structure having an opening, a head comprising a base disposed in the opening, and a valve assembled with the base. The base comprises a boss disposed outside the tank, at least one first channel comprising an axial part along the axis which is not open connected with the inside of the tank, and at least one radial part. The at least one radial part is pierced radially in the boss until the radial part joins the axial part. The valve has a substantially annular shape comprising a first bore corresponding to the boss in order to be able to be engaged on the boss, and at least one second channel, one end of which opens into the first bore axially in line with said at least one radial part. A tank comprising such a head is also provided.

9 Claims, 5 Drawing Sheets

(56) References Cited

U.S. PATENT DOCUMENTS

| | | | |
|---|---|---|---|
| 5,673,934 A | 10/1997 | Saccone et al. | |
| 6,186,356 B1 | 2/2001 | Berkley et al. | |
| 2007/0284380 A1* | 12/2007 | Busby | F17C 13/06 |
| | | | 220/727 |
| 2009/0014089 A1* | 1/2009 | Takeshita | F17C 13/04 |
| | | | 141/192 |
| 2014/0103051 A1* | 4/2014 | Kanezaki | F17C 1/00 |
| | | | 220/587 |

FOREIGN PATENT DOCUMENTS

| | | | |
|---|---|---|---|
| DE | 202012101004 U1 | 6/2013 | |
| DE | 1020140103390 A1 | 9/2014 | |
| EP | 3101316 A1 | 12/2016 | |
| WO | WO-2018123866 A1 * | 7/2018 | F16K 27/00 |

OTHER PUBLICATIONS

Preliminary Search Report for French Application No. 1904769 dated Jan. 28, 2020.

* cited by examiner

[Fig. 1] - PRIOR ART
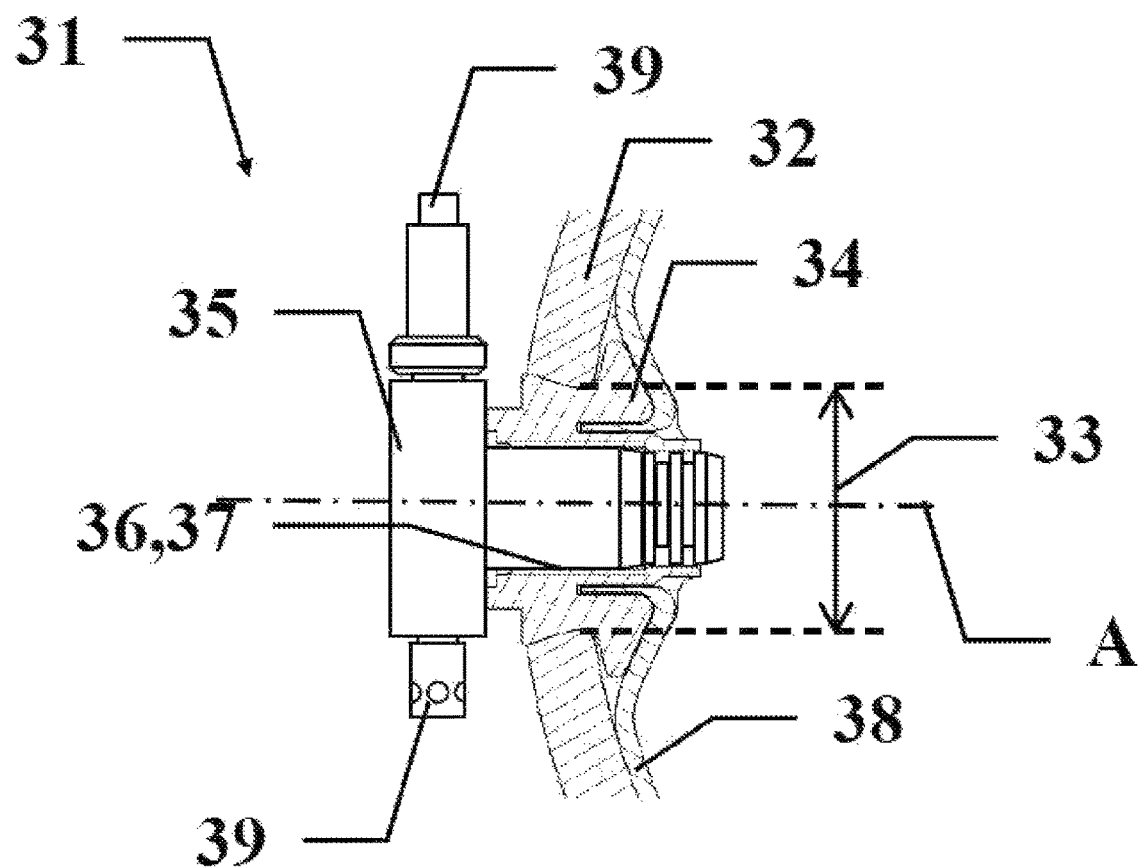

[Fig. 2]
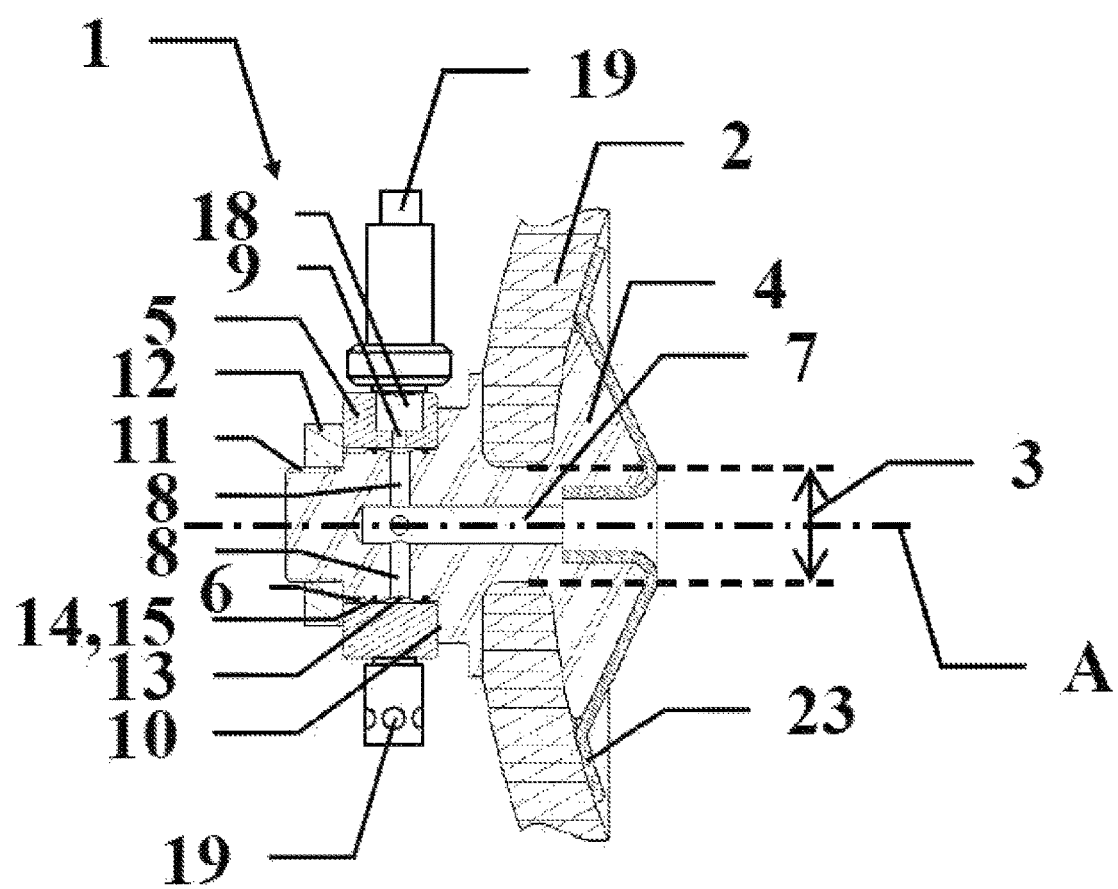

[Fig. 3]
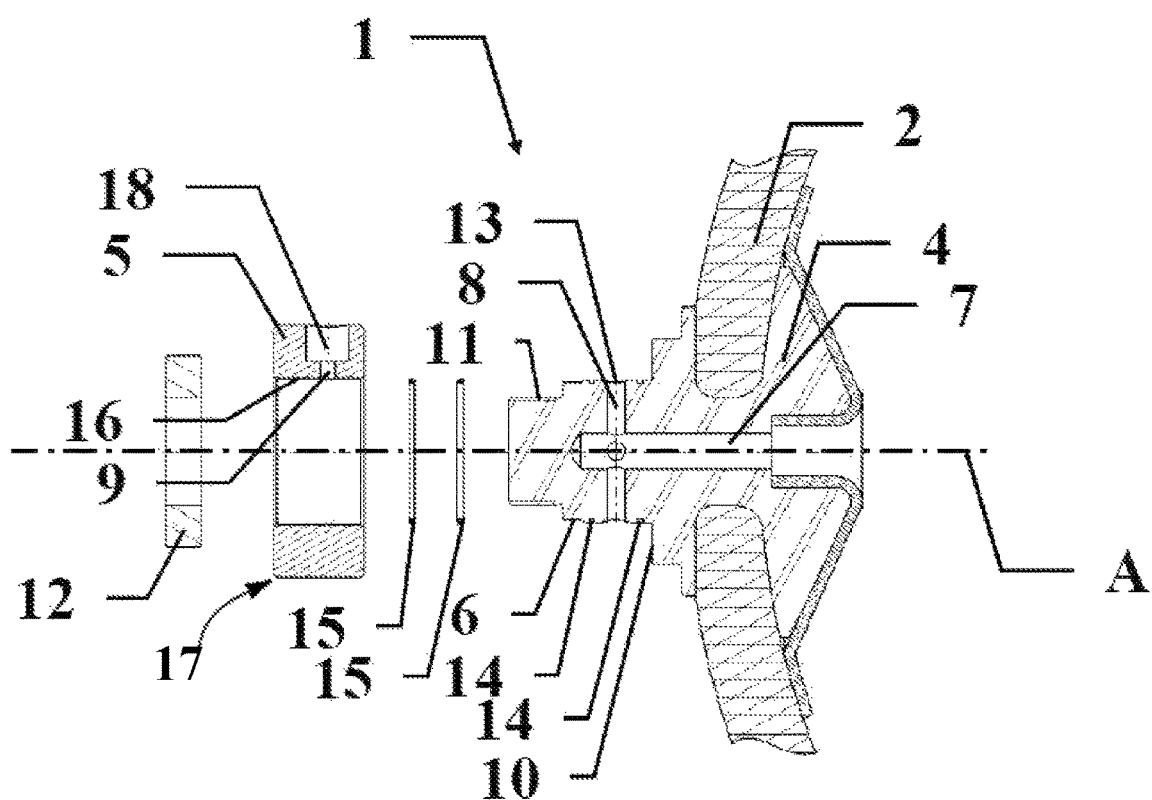

[Fig. 4]
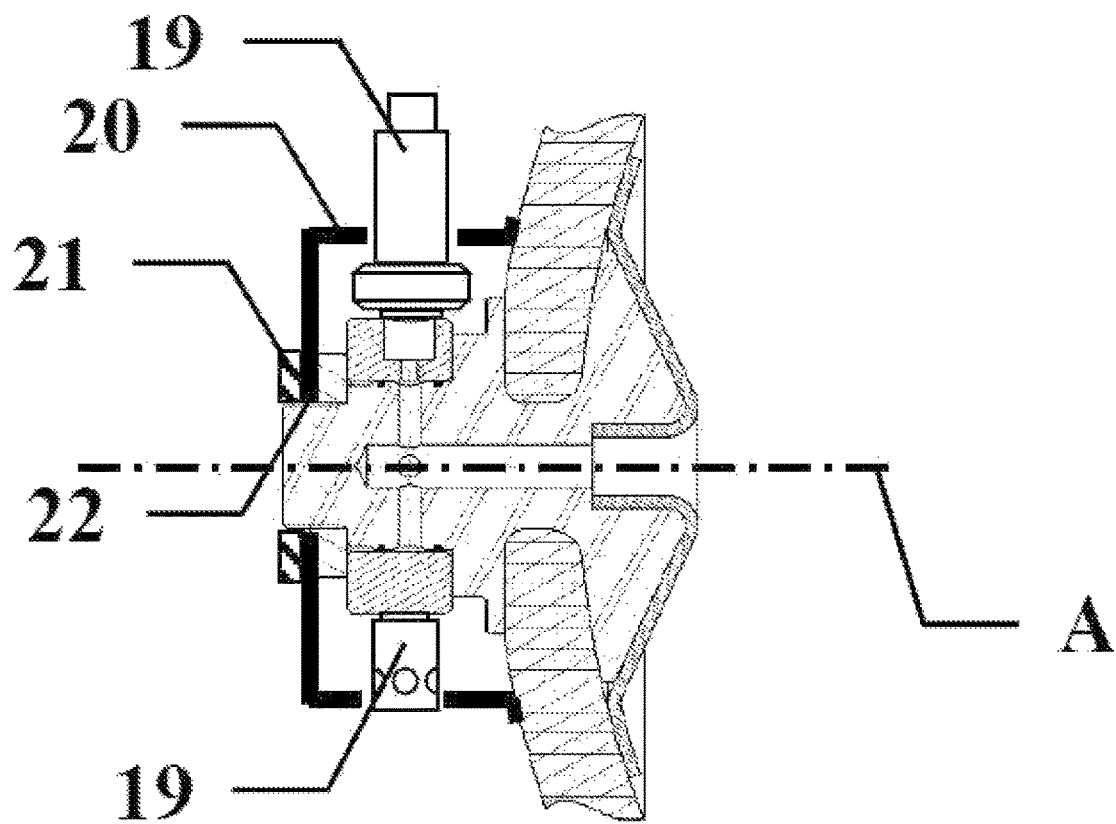

[Fig. 5]
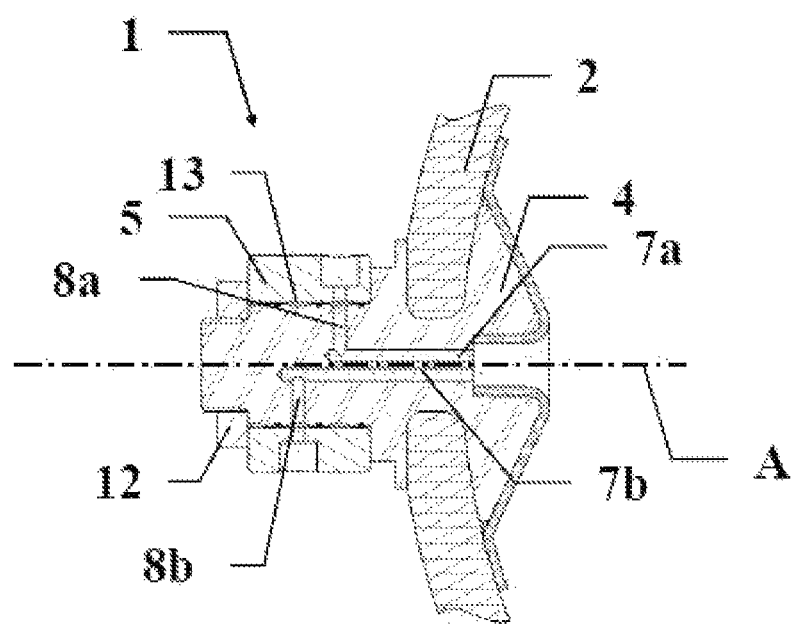

HEAD FOR A PRESSURIZED GAS TANK

CROSS-REFERENCE TO RELATED APPLICATIONS

This application is the US national phase of PCT/EP2020/062456, which was filed on May 5, 2020, which claims priority to FR 19 04769, filed May 7, 2019.

FIELD OF THE DISCLOSURE

The present disclosure relates to the field of pressurized gas tanks, for gases such as hydrogen, and more particularly to a tank head.

BACKGROUND

With reference to FIG. 1, which illustrates an embodiment of the prior art, it is known to produce tanks for pressurized gases, such as hydrogen, comprising a structure 32 made of composite material and comprising a substantially circular opening 33 around an axis A. A head 31 closes said opening 33 and ensures the filling and drawing functions of the tank. For this purpose, said head 31 comprises a base 34, which is substantially circular about the axis A, and is disposed, advantageously in a sealed manner, in the opening 33, and a valve 35 assembled with the base 34. According to the prior art, the base 34 is pierced with a threaded bore 37, substantially axial along the axis A. The valve 35 comprises a threaded male part 36 adapted to be screwed, advantageously in a sealed manner, into said threaded bore 37. The valve 35 is shaped to accommodate at least one fitting 39 outside the tank. The valve 35 is pierced with at least one channel fluidly connecting the interior of the tank through the end of the threaded male portion 36 with said at least one fitting 39.

Such an embodiment requires a large-diameter base 34 in that the threaded bore 37 must be large in diameter to withstand the stress axially applied to the valve 35 due to the pressure difference between the inside and outside of the tank. In addition, the assembly between the threaded bore 37 and the threaded male part 36 is costly when machining, as it must be carried out carefully in order to ensure a seal. Furthermore, the orientation of the valve 35 cannot be adjusted in that it is determined by the end stop of the threaded male part 36 in the threaded bore 37.

There are problems with the current methods of implementation. These current problems are addressed with a tank head that overcomes these drawbacks.

SUMMARY

The disclosure relates to a tank head that is a pressurized gas tank, for a gas such as hydrogen for example. The tank head is of the type comprising a structure made of composite material and comprising a substantially circular opening around an axis, a head comprising a base, substantially circular around the axis, disposed in the opening, and a valve assembled with the base. The base comprises a boss substantially cylindrical along the axis, outside the tank, and at least one first channel comprising an axial part along the axis which is not open connected with the inside of the tank, and at least one radial part pierced radially in the boss until it joins the axial part. The valve has a substantially annular shape comprising a first bore corresponding to the boss in order to be able to be engaged on the boss and at least one second channel, one end of which opens into the first bore axially in line with said at least one radial part.

Particular features or embodiments, which may be used alone or in combination, are:

- the valve and/or the boss comprises, substantially in line with the at least one radial part or the at least one second channel, at least one annular chamber along the axis,
- the valve and/or the boss comprises two annular grooves along the axis, suitable for receiving a seal, each arranged axially on either side of the at least one radial part or the at least one second channel,
- the base further comprises a shoulder upstream of the boss and a threaded portion downstream of the boss adapted to receive a first threaded ring adapted to clamp the valve against the shoulder,
- the valve further comprises on an external surface at least one orifice connected with one of said at least one second channel, suitable for receiving a fitting,
- the head further comprises a protective cap covering the base and the valve, substantially bell-shaped about the axis, comprising a second bore corresponding to the threaded part so as to be able to be engaged on the threaded part and a second threaded ring able to clamp the cap against the first threaded ring, In a second aspect, the disclosure concerns a tank comprising such a head.

BRIEF DESCRIPTION OF THE DRAWINGS

The disclosure will be better understood upon reading the following description, given only as an example, and with reference to the attached drawings, in which:

FIG. 1 shows a profile view of a tank head according to the prior art;

FIG. 2 shows a profile view of a tank head according to the disclosure;

FIG. 3 shows an exploded cutaway view of the tank head in FIG. 2;

FIG. 4 shows the tank head of FIG. 2 with a cover in a profile cutaway view; and FIG. 5 illustrates, in a profile cutaway view, a tank head with some alternative features.

DETAILED DESCRIPTION

With reference to FIGS. 2 and 3, a tank according to the disclosure comprises a structure 2 and a head 1. The structure 2 is made of composite material, typically by filament winding. This structure 2 comprises at least one substantially circular opening 3 about an axis A. A tank head 1, which is the subject of the present disclosure, is intended to be arranged in a sealed manner in said opening 3. Such a head 1 is intended to perform various functions related to the use of a pressurized gas contained in the tank: Filling, drawing, pressure measurement, safety valve or fuse, etc. For this purpose, a head 1 comprises a base 4 and a valve 5. The base 4 is substantially rotationally symmetrical about the axis A and is arranged in the opening 3. Thus, the base 4 passes through the structure 2 forming the tank wall. The valve 5 is assembled with the base 4, outside the tank. The valve 5 allows the connection of various fittings 19.

According to an important feature of the disclosure, the assembly of the valve 5 with the base 4 is carried out according to a new and innovative principle. The base 4 comprises a boss 6, and the valve 5 comprises a bore 16 complementary to the boss 6.

The boss 6 is substantially cylindrical along the axis A and is located on the part of the base 4 situated outside the tank. At least one first channel, used for filling and/or drawing gas, is fashioned through the base 4. It is comprised of two parts 7, 8. An axial portion 7, along the axis A, is drilled, substantially cylindrically, preferably aligned with the axis A. This axial portion 7 is connected with the interior of the tank. On the contrary, it is not open on the side where the base 4 exits the tank. The first channel further comprises at least one radial portion 8, which is drilled radially into the boss 6 until it meets the axial portion 7. Said first channel thus fluidly connects the interior of the tank with the outer surface of the boss 6. Alternatively, as shown in FIG. 5, the base 4 may comprise more than one first channel. FIG. 5 shows an embodiment comprising two first channels with two axial parts 7a, 7b, each possibly connected with at least one radial part 8a, 8b.

The valve 5 has a substantially annular shape. It has a bore 16 corresponding to the boss 6. In this way, the valve 5, via its bore 16, can be engaged on the boss 6. The valve 5 further comprises at least a second channel 9. This second channel has an end opening into the bore 16 of the valve 5, axially substantially in line with said at least one radial part 8, 8a, 8b.

The dimensional tolerance between the boss 6 and the bore 16 is adjusted in such a way as to allow simple assembly and disassembly, advantageously without tools, while at the same time making it possible to achieve a gas-tight seal, if necessary using at least one sealing component, such as a seal.

The disclosure, by replacing an axial mounting of the valve 35 relative to the base 34 with a radial mounting of the valve 5 relative to the base 4, removes the pressure stress exerted by the gas tending to extract the valve 35 from the base 34. The annular shape of the valve 5 and its arrangement around the boss 6 of the base 4 ensures a balanced distribution of stress.

In addition, the large radial dimension of the threaded male part 36 and the corresponding threaded bore 37, which was necessary in the prior art to withstand the pressure stress, is no longer necessary. The radial dimension of the base 4, at the level of its neck, is, according to the disclosure, solely determined by the desired flow rate for said at least one first channel which determines the dimension of said at least one axial part 7, 7a, 7b. It follows that the size of the opening 33 of the neck, according to the prior art, can be greatly reduced to that of the opening 3 of the neck, according to the disclosure. The structure 2 can thus be extended, approaching the axis A. The base 4 can thus be more hollow at its interface with the structure 2. The base 4, which absorbs the pressure stress alone, is also better able to withstand the pressure stress. In addition, the disclosure can be implemented using simpler and therefore less expensive machining.

According to another characteristic of the disclosure, at least one annular chamber 13 of axis A is advantageously provided at the interface between the boss 6 of the base 4 and the bore 16 of the valve 5. Such an annular chamber 13 advantageously allows the fluid connection of said at least one radial part 8 and said at least one second channel 9. Said annular chamber 13 is typically formed by cutting an annular groove of axis A into the outer surface of the boss 6 of the base 4, in the inner surface of the bore 16 of the valve 5, or both. This annular chamber 13 is axially arranged substantially in line with the radial parts 8 and the second ducts 9, and if necessary has a sufficient width, so as to be in fluid communication with several or even all of the radial parts 8 and several or even all of the second ducts 9.

This allows a second channel 9 to be connected to at least one radial part 8, even if they are not radially aligned and, if applicable, if they are not perfectly aligned in an axial direction. This still allows for a different number of radial parts 8 and second channels 9 to be angularly aligned or not. Even more advantageously, this feature allows the valve 5 to be mounted on the base 4 without worrying about the orientation of the valve 5 relative to the base 4 about the axis A. This orientation can then be arbitrarily adjusted according to, for example, the arrangement of the fittings 19. This again allows the valve 5 to be modified to include a different number of second channels 9, without modifying the base 4.

In order to ensure gas tightness around the radial parts 8 and the second channels 9, and possibly the annular chamber 13, the interface between the boss 6 of the base 4 and the bore 16 of the valve 5 is advantageously equipped with seals 15. These seals 15, for example O-rings, are arranged in two annular grooves 14 of axis A, each of which is able to accommodate at least one such seal 15. Each of these grooves 14 is arranged in the bore 16 of the valve 5, in the boss 6 of the base 4, or in both. At least one such groove 14 is arranged axially on either side of the radial parts 8 and the second channels 9, so as to enclose them as a whole.

In order to hold the valve 5 in place on the boss 6, the base 4 further comprises a shoulder 10, having a larger radial dimension than the boss 6, so as to form an axial stop. Said shoulder 10 is axially located upstream of the boss 6, i.e. between the boss 6 and the structure 2. The base 4 further comprises a threaded portion 11 downstream of the boss 6, i.e. at the distal end of the base 4, with a radial dimension advantageously smaller than that of the boss 6. The base 4 further comprises a first threaded ring 12 suitable for screwing onto said threaded portion 11 and of greater radial external dimension than the bore 16. Thus, the threaded ring 12 allows the valve 5 to be tightened against the shoulder 10. The axial length of the valve 5 is advantageously slightly greater than the axial length of the boss 6. Thus, by screwing on the threaded ring 12, the valve 5 can be constrained and thus fixed axially and also radially by clamping. In contrast to the prior art, the orientation of the valve 5 can be freely adjusted in that the immobilisation of the valve 5 by tightening the threaded ring 12 is independent of its orientation, which can be freely modified by rotation around the boss 6, before tightening.

It has been seen previously that a second channel 9 has a first end opening into the bore 16 of the valve 5. The other end of a second channel 9 opens at the outer surface 17 of the valve 5. The outer surface 17 here refers to all surfaces of the valve 5 with the exception of the bore 16. Thus, a second channel 9 can open radially into the generating surface, as shown in the embodiment of the figures, but also axially into one of the two flanks. This opening is advantageously made in an orifice 18 shaped to receive a fitting 19. This configuration may include a threaded hole. A fitting 19 may include a filling/drawing line connection, a sensor, a fuse, etc.

In a further feature, more particularly illustrated in FIG. 4, the head 1 may further comprise a protective cover 20. Such a cover 20 advantageously has a substantially circular bell shape about the axis A, so as to cover the base 4 and the valve 5. The bottom of the bell advantageously comes into contact with the structure 2. The cover 20 may further comprise axial notches to engage the bell when protruding fittings 19 are present. The cover 20 has a second bore 22 at the top of the bell corresponding to the threaded portion 11 so that it can be engaged with the threaded portion 11. A second threaded ring 21, which can be screwed onto the threaded part 11, then clamps the cover 20, which is engaged via its bore 22 on the threaded part 11, against the first threaded ring 12.

Thus, the cover 20 is advantageously attached directly to the base 4.

Alternatively, a single threaded ring 12, 21, can be used to simultaneously tighten the valve 5 and the cover 20.

The disclosure also concerns a tank equipped with such a head 1.

The disclosure has been illustrated and described in detail in the drawings and the preceding description. This should be considered as illustrative and by way of example and not as limiting the disclosure to this description alone. Many different designs are possible.

LIST OF REFERENCE SIGNS

- 1, 31: head,
- 2, 32: structure,
- 3, 33: opening,
- 4, 34: base,
- 5, 35: valve,
- 6: boss,
- 7: axial part,
- 8: radial part,
- 9: second channel,
- 10: shoulder,
- 11: threaded part,
- 12: first threaded ring,
- 13: annular chamber,
- 14: annular groove,
- 15: seal,
- 16: first bore,
- 17: outer surface,
- 18: orifice,
- 19, 39: fitting,
- 20: cover,
- 21: second threaded ring,
- 22: second bore,
- 23, 38: envelope,
- 36: threaded male part,
- 37: threaded bore.

The invention claimed is:

1. A head of a tank for a pressurized gas comprising:
   a structure made of composite material and comprising a circular opening around an axis;
   a head comprising a base, circular about the axis, disposed in the circular opening;
   a valve assembled with the base, wherein the base comprises a boss cylindrical along the axis outside the tank, wherein the boss includes at least one first channel comprising an axial part along the axis which is not open connected to an inside of the tank, and at least one radial part pierced radially in the boss until the at least one radial part joins the axial part, and wherein the valve has an annular shape comprising a first bore corresponding to the boss in order to be able to be engaged on the boss and at least one second channel, one end of the at least one second channel opens into the first bore axially in line with the at least one radial part;
   wherein the base further comprises a shoulder upstream of the boss and a threaded portion downstream of the boss adapted to receive a first threaded ring adapted to clamp the valve against the shoulder; and
   a protective cover covering the base and the valve that is bell-shaped about the axis, comprising a second bore corresponding to the threaded portion so as to be able to be engaged on the threaded portion and a second threaded ring able to clamp the protective cover against the first threaded ring.

2. The head according to claim 1, wherein the valve and/or the boss comprises, in line with said at least one radial part or said at least one second channel, at least one annular chamber along the axis.

3. The head according to claim 1, wherein the valve and/or the boss comprises two annular grooves along the axis, capable of accommodating a seal, each of the two annular grooves arranged axially on either side of said at least one radial part or of said at least one second channel.

4. The head according to claim 1, wherein the valve has on an outer surface at least one orifice connected with one of said at least one second channel, suitable for receiving a fitting.

5. A tank comprising:
   a tank structure with the head according to claim 1.

6. The tank according to claim 5, wherein the tank structure is made of a composite material.

7. The tank according to claim 6, including an envelope having a radially inner portion received within the at least one first channel of the boss and a radially outer portion extending over the base and in contact against an inner surface of the tank structure.

8. The head according to claim 1, wherein a portion of the protective cover that surrounds the second bore is clamped directly between the first threaded ring and the second threaded ring.

9. The head according to claim 8, wherein the valve is clamped directly between the first threaded ring and the shoulder.

* * * * *